US012594932B2

(12) United States Patent
Sung et al.

(10) Patent No.: US 12,594,932 B2
(45) Date of Patent: Apr. 7, 2026

(54) METHOD FOR PREVENTING COLLISION WITH VEHICLE LOCATED AHEAD WITH ITS SIDE BEING SHOWN AND VEHICLE CONTROL SYSTEM OF SAME

(71) Applicants:Hyundai Motor Company, Seoul (KR); Kia Corporation, Seoul (KR)

(72) Inventors: Dong Hyun Sung, Whasung-Si (KR); Dae Seok Jeon, Whasung-Si (KR); Yong Seok Kwon, Whasung-Si (KR); Sang Min Lee, Whasung-Si (KR); Tae Geun An, Whasung-Si (KR); Hyoung Jong Wi, Whasung-Si (KR); Joon Ho Lee, Whasung-Si (KR); Eung Seo Kim, Whasung-Si (KR); Sang Yeob Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 18/512,952

(22) Filed: Nov. 17, 2023

(65) Prior Publication Data

US 2024/0239334 A1      Jul. 18, 2024

(30) Foreign Application Priority Data

Jan. 17, 2023    (KR) ........................ 10-2023-0006741

(51) Int. Cl.
B60W 30/09        (2012.01)
B60W 10/18        (2012.01)
(Continued)

(52) U.S. Cl.
CPC ............ B60W 30/09 (2013.01); B60W 10/18 (2013.01); B60W 10/20 (2013.01);
(Continued)

(58) Field of Classification Search
CPC ...... B60W 30/09; B60W 10/18; B60W 10/20; B60W 30/0956; B60W 30/182;
(Continued)

(56) References Cited

U.S. PATENT DOCUMENTS 6,926,374  B2      8/2005  Dudeck et al.
2020/0010082  A1*    1/2020  Matsunaga ....... B60W 30/0953

FOREIGN PATENT DOCUMENTS

CN          113442852          9/2021
JP        2009-205358          9/2009
(Continued)

*Primary Examiner* — Donald J Wallace
(74) *Attorney, Agent, or Firm* — MORGAN, LEWIS & BOCKIUS LLP

(57) ABSTRACT

In a method of collision prevention strategy for a vehicle and a vehicle control system of the same, the vehicle control system includes a recognition/determination unit which recognizes whether a front vehicle is a target vehicle which is stopped on the side either slowing down or stopped, and determines a state of road occupancy of the target vehicle: a driving situation determination unit which determines a driving situation of a host vehicle; a control strategy unit which determines a strategy before preventing collision according to the result of the recognition/determination unit and the driving situation determination unit; and an actuator operation unit which controls at least a warning mean, a steering device, and a braking device according to the determination of the control strategy unit.

16 Claims, 13 Drawing Sheets

(51) Int. Cl.
    *B60W 10/20*     (2006.01)
    *B60W 30/095*     (2012.01)
    *B60W 30/182*     (2020.01)
    *B60W 40/02*     (2006.01)

(52) U.S. Cl.
    CPC ...... *B60W 30/0956* (2013.01); *B60W 30/182*
        (2013.01); *B60W 40/02* (2013.01); *B60W*
        *2552/05* (2020.02); *B60W 2554/4041*
        (2020.02); *B60W 2554/4044* (2020.02); *B60W*
        *2554/80* (2020.02)

(58) Field of Classification Search
    CPC ............. B60W 40/02; B60W 2552/05; B60W
        2554/4041; B60W 2554/4044; B60W
        2554/80; B60W 2050/143; B60W
        2554/402; B60W 2554/4042; B60W
        2554/802; B60W 50/14; B60W 40/04;
        B60W 2710/18; B60W 2710/20
    See application file for complete search history.

(56)         References Cited

FOREIGN PATENT DOCUMENTS

| | | |
|---|---|---|
| JP | 2018-005441 | 1/2018 |
| KR | 10-2018-0065585 | 6/2018 |
| KR | 10-2018-0066524 | 6/2018 |
| KR | 10-2021-0031165 | 3/2021 |
| KR | 10-2021-0124602 | 10/2021 |
| KR | 10-2022-0097117 | 7/2022 |

\* cited by examiner

Determining stopped vehicle
with its side being shown :
Determining rear stop vehicle
based on heading degree and size
(slant stop)

Preventing
delayed steering

Driving mode
: Manual
driving expressway

Amount of
Lateral movement

Lane occupancy (X)   Lane occupancy (O)   Lane occupancy (X)

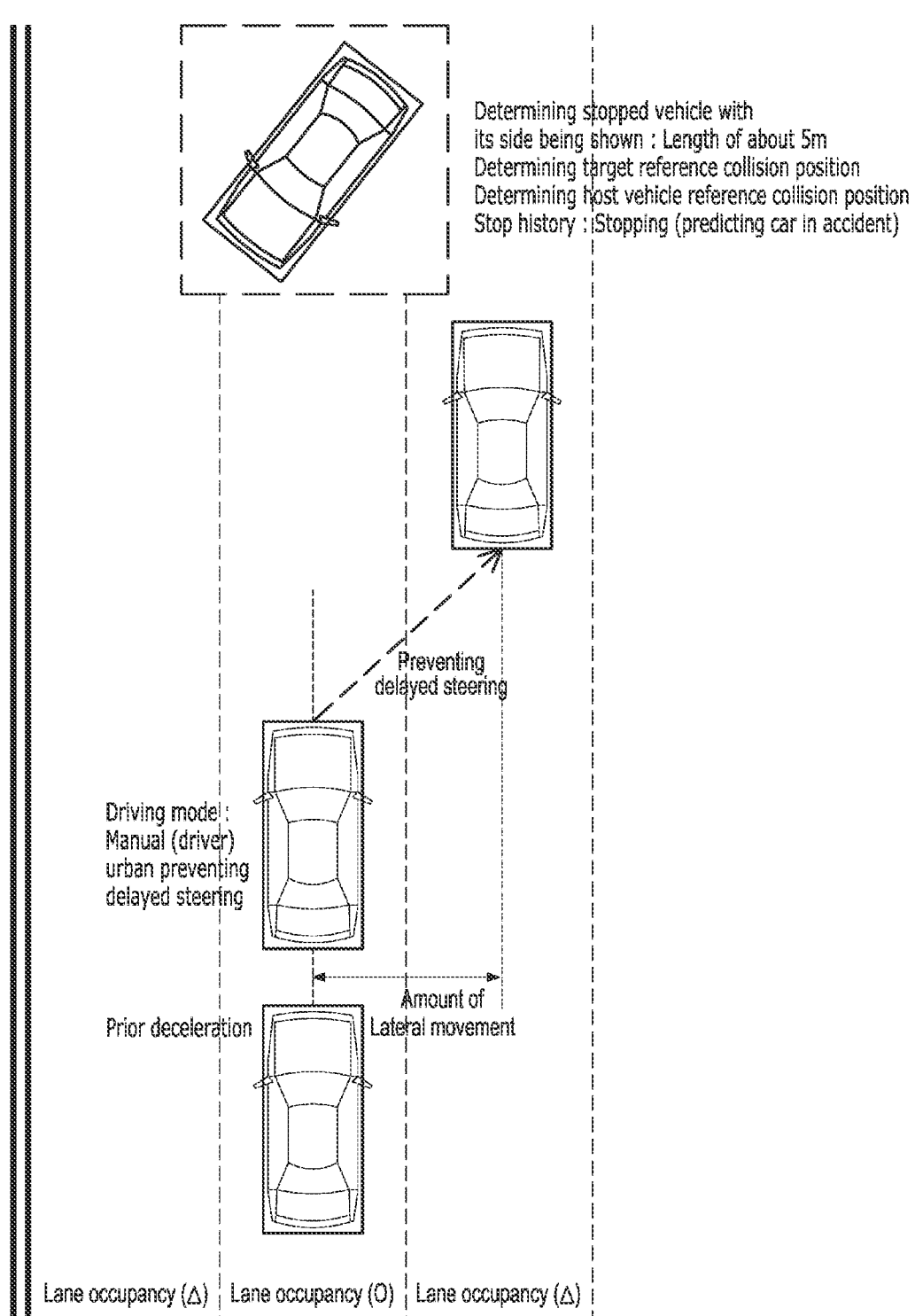

Determining stopped vehicle with
its side being shown : Length of about 5m
Determining target reference collision position
Determining host vehicle reference collision position
Stop history : Stopping (predicting car in accident)

Preventing
delayed steering

Driving model :
Manual (driver)
urban preventing
delayed steering

Amount of
Lateral movement

Prior deceleration

Lane occupancy (△)    Lane occupancy (O)    Lane occupancy (△)

FIG. 9

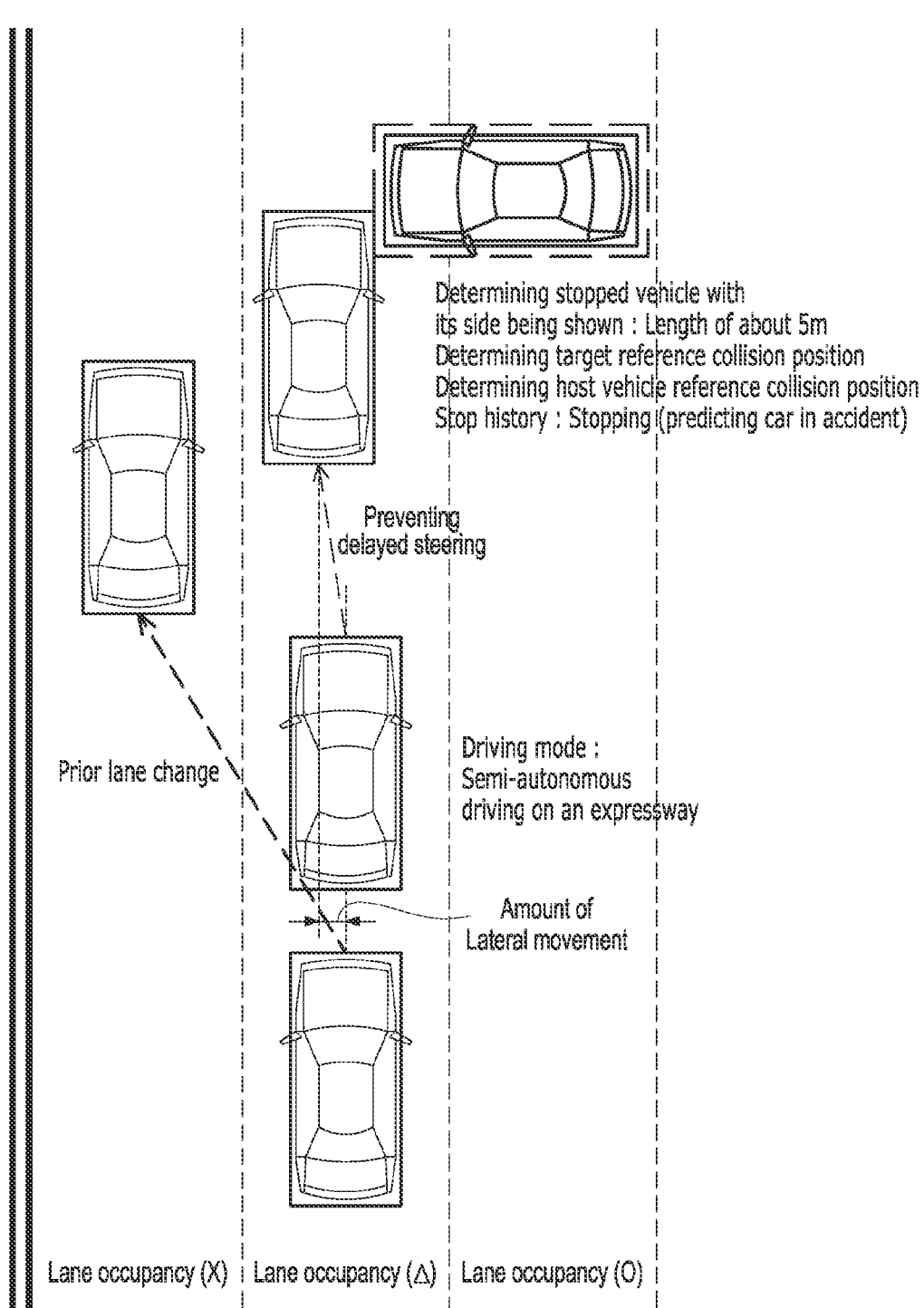

Determining stopped vehicle with
its side being shown : Length of about 5m
Determining target reference collision position
Determining host vehicle reference collision position
Stop history : Stopping (predicting car in accident)

Preventing
delayed steering

Prior lane change

Driving mode :
Semi-autonomous
driving on an expressway

Amount of
Lateral movement

Lane occupancy (X)   Lane occupancy (△)   Lane occupancy (O)

FIG. 10

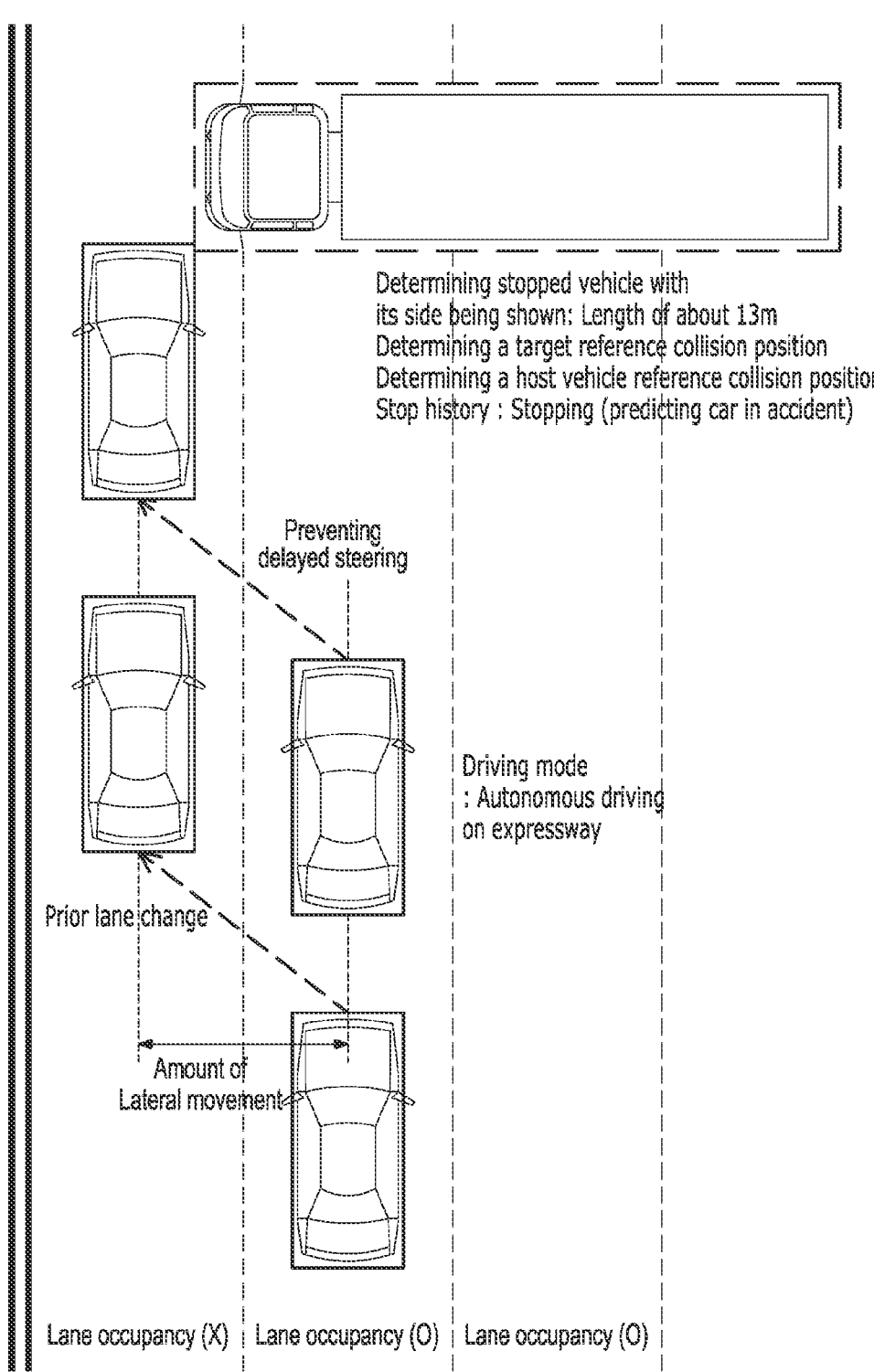

Determining stopped vehicle with
its side being shown: Length of about 13m
Determining a target reference collision position
Determining a host vehicle reference collision position
Stop history : Stopping (predicting car in accident)

Preventing
delayed steering

Driving mode
: Autonomous driving
on expressway

Prior lane change

Amount of
Lateral movement

Lane occupancy (X)    Lane occupancy (O)    Lane occupancy (O)

FIG. 13

METHOD FOR PREVENTING COLLISION WITH VEHICLE LOCATED AHEAD WITH ITS SIDE BEING SHOWN AND VEHICLE CONTROL SYSTEM OF SAME

CROSS-REFERENCE TO RELATED APPLICATION

The present application claims priority to Korean Patent Application No. 10-2023-0006741, filed on Jan. 17, 2023, the entire contents of which is incorporated herein for all purposes by this reference.

BACKGROUND OF THE PRESENT DISCLOSURE

Field of the Present Disclosure

The present disclosure relates to a method of collision prevention strategy for a vehicle and a vehicle control system of the same.

Description of Related Art

Conventionally, a forward collision prevention support system is known as a collision prevention assist system.

The forward collision prevention system can perform alerts and automatic brakes by determining whether a collision with a vehicle or a pedestrian ahead is present using a forward radio detection and ranging (RADAR) and a camera.

Furthermore, when the driver strongly presses the brake pedal during a risk of a collision, the braking force is transmitted to the maximum value, and when the driver presses the accelerator pedal during a risk of a collision, the system switches off.

However, such conventional system has issues of insufficiency in stopping or in slowing down for a stopped vehicle with its side being shown in the case of an accident, breakdown, parking, or extremely low speed crossing, etc.

In the case of a stopped vehicle with its side being shown which is in parking or in extremely low speed crossing, the conventional system has not been provided warnings nor controlled to prevent the possibility of sensitive or erroneous control, and thus countermeasures are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

The present disclosure aims to solve at least one of the problems of the related art described above.

The present disclosure enables the perception/collision prevention against a stopped vehicle with its side being shown due to a vehicle accident, breakdown, and the like, on a motorway and a highway, and prevents sensitivity/erroneous control by making a target selection and control method for a vehicle stopped on the side.

Furthermore, in the case of a semi-autonomous or autonomous driving vehicle without driver intervention, active intervention in control is induced with respect to the vehicle stopped on the side to ensure safe driving.

Various aspects of the present disclosure are directed to providing the vehicle control system including a recognition/determination unit which recognizes whether a front vehicle is a target vehicle which is stopped on the side either slowing down or stopped, and is configured to determine a state of road occupancy of the target vehicle; a driving situation determination unit which is configured to determine a driving situation of a host vehicle; a control strategy unit which is configured to determine a strategy before preventing collision according to the result of the recognition/determination unit and the driving situation determination unit; and an actuator operation unit which is configured to control at least a warning mean, a steering device, and a braking device according to the determination of the control strategy unit.

In at least an exemplary embodiment of the present disclosure, the recognition/determination unit is configured to recognize at least a vehicle type, a size, a direction, a position, a moving speed, the state of road and/or lane occupancy, and a stop scenario with respect to the target vehicle.

In at least an exemplary embodiment of the present disclosure, the driving situation determination unit is configured to perform at least a host vehicle route prediction, driving road determination, driving mode determination, or state of driving determination.

In at least an exemplary embodiment of the present disclosure, the host vehicle route prediction is determined as at least as driving straight, turning, or following, the driving road determination is determined at least as an urban road, a national road, or a highway, the driving mode determination includes at least a manual mode, a semi-autonomous driving mode, and an autonomous driving mode, and the driving state determines as at least as normal, abnormal, or emergency.

In at least an exemplary embodiment of the present disclosure, the control strategy unit is configured to determine at least a method of preventing collision according to a state of road occupancy of the target vehicle, a degree risk of collision according to a position and a size of the target vehicle, and a degree of system intervention according to a result from the driving situation determination unit.

In at least an exemplary embodiment of the present disclosure, the control strategy unit is configured to vary the degree of system intervention by urban road, national highway, and expressway, varies the degree of system intervention by driving modes such as the manual mode, the semi-autonomous driving mode, and the autonomous driving mode, or varies the degree of system intervention by driving state such as normal, abnormal, and emergency.

In at least an exemplary embodiment of the present disclosure, the control strategy unit can determine collision overlap and/or offset according to a position and size of the target vehicle to determine a risk of collision, and is configured to determine an index according to the colliding position of the target vehicle and the host vehicle.

In at least an exemplary embodiment of the present disclosure, the index includes at least a target vehicle reference index determined according to a distance to a position of a host vehicle based on the target vehicle, the first host vehicle reference index determined according to a distance to a center position of the target vehicle based on the host vehicle, the second host vehicle reference index determined according to a distance to a front or rear of the target vehicle based on the host vehicle, and the third host vehicle reference index determined according to an overlap length for the host vehicle of the target vehicle based on the host vehicle.

In at least various exemplary embodiments of the present disclosure, the target vehicle reference index further increases as the target vehicle travels or travels in the opposite direction of the predicted direction, and the first host vehicle reference index and the second host vehicle reference index further increases as the target vehicle travels or travels in the predicted direction.

In the determining of the preventing collision strategy, the control strategy unit prioritizes a prevention by braking when the driving road is on the urban road, prioritizes a prevention by steering when the driving road is on a highway, prioritizes a prevention by steering when the driving mode is on a manual mode, prioritizes a prevention by braking when the driving mode is on autonomous driving mode, and prioritizes a prevention by steering when the driving mode is on autonomous driving mode.

According to various exemplary embodiments of the present disclosure, a method for a collision preventing strategy includes a recognition/determination of recognizing whether a front vehicle is a target vehicle with its side being shown and is either slowing down or stopped and determining the road occupancy state of the target vehicle; a driving situation determination of determining a driving situation of a host vehicle; a control strategy of determining a collision preventing strategy according to the result from the recognition/determination and the driving situation determination; and an actuator operation of controlling at least as a warning mean, a steering device, or a braking device according to the determination of the control strategy.

In at least an exemplary embodiment of the present disclosure, the recognition/determination includes recognizing at least the vehicle type, the size, the direction, the position, the movement speed, the state of road and/or lane occupancy, and the stop scenario with respect to the target vehicle.

In at least an exemplary embodiment of the present disclosure, the determining of the driving situation includes performing at least predicting a route of a host vehicle, determining a driving road, determining a driving mode, and determining a driving state.

In at least an exemplary embodiment of the present disclosure, predicting of the host vehicle route determines at least as driving straight, turning, or following, the driving road determination determines at least the urban road, the national highway, or the expressway, the driving mode determination includes at least the manual mode, the semi-autonomous driving mode, and the autonomous driving mode, and the driving state determination is determined as at least as normal, abnormal, or emergency.

In at least an exemplary embodiment of the present disclosure, the control strategy includes determining at least a method of preventing collision according to the road occupancy state of the target vehicle, the degree of risk of collision according to the position and the size of the target vehicle, and the degree of system intervention according to the result of the driving situation determination unit.

In at least an exemplary embodiment of the present disclosure, the control strategy varies by the degree of system intervention for each urban road, a national highway, and an expressway, varies the degree of system intervention by driving mode for each manual mode, semi-autonomous driving mode, and autonomous driving mode or varies the degree of system intervention by each driving state for each normal, abnormal, and emergency.

In at least an exemplary embodiment of the present disclosure, the control strategy includes determining collision overlap and/or offset according to the position and size of the target vehicle in the determination of the risk of collision, and determining an index according to the position of collision of the target vehicle and the host vehicle.

In at least an exemplary embodiment of the present disclosure, the index includes at least a target vehicle reference index determined according to a distance to a position of a host vehicle based on the target vehicle quantity, the first host vehicle reference index determined according to a distance to a center position of the target vehicle based on the host vehicle, the second host vehicle reference index determined according to a distance to a front or rear of the target vehicle based on the host vehicle, and the third host vehicle reference index determined according to the overlap length for the host vehicle of the target vehicle based on the host vehicle.

In at least an exemplary embodiment of the present disclosure, the target vehicle reference index is further increases as the target vehicle advances or advances in the opposite direction of the predicted direction, and the first host vehicle reference index and the second host vehicle reference index further increases as the target vehicle travels or travels in the predicted direction.

In the determining of the collision preventing strategy, the control strategy prioritizes a prevention by braking when the driving road is an urban road, prioritizes a prevention by steering when the driving road is an expressway, prioritizes a prevention by braking when the driving mode is on a manual mode, and prioritizes a prevention by steering when the driving mode is on autonomous driving.

According to various exemplary embodiments of the present disclosure, the present disclosure can recognize and prevent the collision against the stopped vehicle which is on the side due to the accident or breakdown on the motorway and the expressway, and can prevent sensitive and erroneous control by strengthening a target selection and control method regarding the stopped vehicle on the side thereof.

Furthermore, in the case of a semi-autonomous or autonomous driving vehicle without intervention of the driver, active control intervention may be induced with respect to the stopped vehicle on the side to ensure safe driving.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5, FIG. 6, FIG. 7, FIG. 8, FIG. 9, FIG. 10, FIG. 11, FIG. 12 and FIG. 13 illustrate a state in which control is performed for driving situations of various target vehicles and front host vehicles according to various exemplary embodiments of the present disclosure.

5

Figure 1:
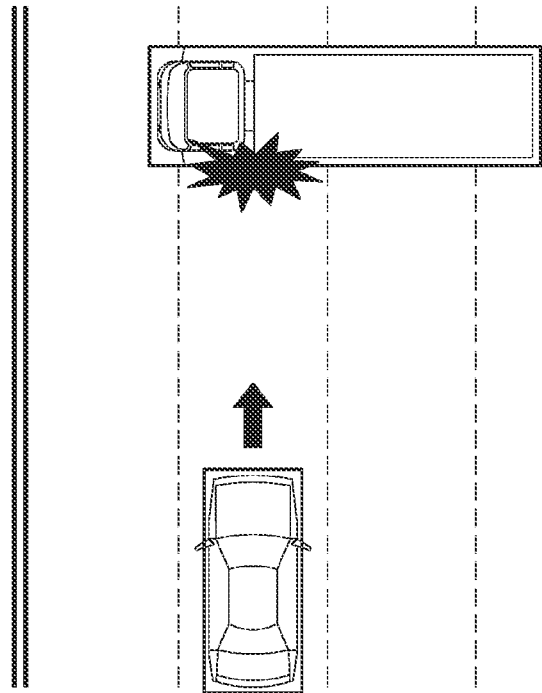
FIG. 1 illustrates a situation where a front vehicle placed vehicle which is stopped on the side can collide with a host vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may be modified in various ways and have various exemplary embodiments of the present disclosure, specific embodiments will be illustrated and described in the drawings. However, this is not intended to limit the present disclosure to specific embodiments, and it should be understood that the present disclosure includes all modifications, equivalents, and replacements included in the concept and technical scope of the present disclosure.

The suffixes "module" and "unit" used in the present specification are used only for name differentiation between elements, and should not be construed as presupposing that they are physicochemically divided or separated or may be so divided or separated.

Terms including ordinals such as "first", "second", etc. are used to describe various elements, but the elements are not limited by the terms. The terms are used only for distinguishing one element from another element.

The term "and/or" is used to include all cases of any combination of a plurality of items to be included. For example, "A and/or B" includes all three cases such as "A", "B", and "A and B".

When it is mentioned that an element is "connected" or "connected" to another component, the element may be directly connected or connected to the other element, but it should be understood that another element exists in between.

The terminology used herein is for solely describing various exemplary embodiments and is not intended to be limiting of the present disclosure. Singular expressions include plural expressions unless the context clearly indicates otherwise. In the present application, it should be understood that the term "include" or "have" indicates that a feature, a number, a step, an operation, a component, a part, or a combination thereof described in the specification is present, but it does not exclude the possibility of existence or addition of one or more other features, numbers, steps, operations, components, parts, or combinations thereof in advance.

Unless otherwise defined, all terms used herein, including technical or scientific terms, have the same meaning as that generally understood by those skilled in the art to which an exemplary embodiment of the present disclosure pertains. It will be further understood that terms, such as those defined in commonly used dictionaries, should be interpreted as having a meaning which is consistent with their meaning in the context of the related art and will not be interpreted in an idealized or overly formal sense unless so defined herein.

Furthermore, the unit or the control unit is a term widely used in naming a controller configured for controlling a vehicle specific function, and does not mean a generic function unit. For example, each unit or control unit may include a communication device communicating with another controller or sensor to control a function in charge, a memory storing an OS or logic command, input/output information, etc., and one or more processors performing comparison, calculation, determination, and the like necessary for controlling a function in charge.

FIG. 1 illustrates a situation where a front vehicle placed vehicle which is stopped on the side can collide with a host vehicle.

Figure 2:
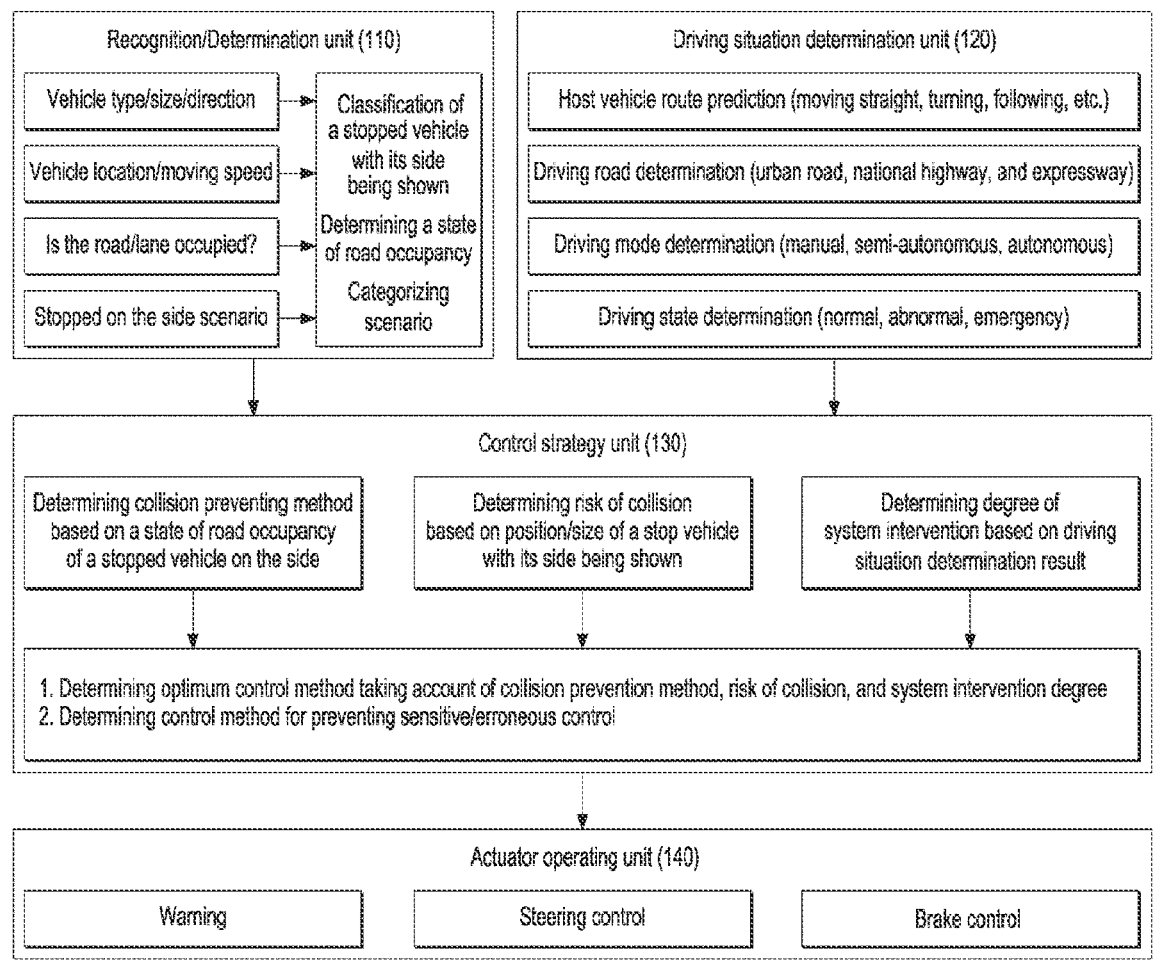
FIG. 2 illustrates a vehicle control system according to various exemplary embodiments of the present disclosure.

As shown in FIG. 2, the preventing collision/prevention strategy apparatus for a vehicle according to an exemplary embodiment of the present disclosure includes a recognition/determination unit 110, a driving situation determination unit 120, a control strategy unit 130, and an actuator operating unit 140.

In an exemplary embodiment of the present disclosure, the recognition/determination unit 110, the driving situation determination unit 120, the control strategy unit 130, the actuator operation unit 140, and the like can perform corresponding functions through a controller including microprocessor. Furthermore, the recognition/determination unit 110, the driving situation determination unit 120, the control strategy unit 130, and the actuator operation unit 140 may be singularly implemented by respective microprocessors, but it may be implemented by one integrated processor. In various exemplary embodiments of the present disclosure, the controller may be implemented in a form of hardware or software, or may be implemented in a combination of hardware and software.

Furthermore, the vehicle control system of the exemplary embodiment further includes a memory configured for storing various data, e.g., input data and/or output data for a software program and commands related thereto.

The recognition/determination unit 110 recognizes a front vehicle which is placed on the side surface across the lane as a target vehicle, simultaneously or subsequently, the driving situation determination unit 120 is configured to determine a driving situation of the host vehicle, the control strategy unit 130 is configured to determine an optimal control strategy for preventing collision to recognize the driving situation and determine the driving situation, and the actuator operation unit 140 is configured to perform controlling of an actuator for preventing collision according to the determination.

First, the recognition/determination unit 110 recognizes and is configured to determine a type, size, direction, position, and moving speed of a vehicle ahead of the target vehicle, a road and/or state of lane occupancy, a side stop scenario, and etc.

In the case of a vehicle traveling on the road in general, a width of a front surface or a rear surface has a length of 1.5 to 2.5 m, and a length of a side surface, e.g., a length from the front surface to the rear surface is 3.6 to 1.3 m.

When the preceding vehicle is recognized, the preceding vehicle can recognize by use of the above-described length information.

Furthermore, the length of the front vehicle detected according to the heading angle may be compensated.

In the instant case, when the heading angle of the front vehicle is in the range of 70 to 110 degrees, it can determine as the target vehicle which is placed while the side is being shown. Here, the heading angle is determined by determining the straight direction of the host vehicle driving lane to the heading angle of 0 degree and determining the direction to the + direction, counterclockwise.

With respect to the position and the moving speed of the target vehicle, it can determine whether to stop based on the changed position or the speed of the target vehicle.

Furthermore, it is possible to check a lane in which the host vehicle can or cannot drive from the lane of the target vehicle and/or the state lane occupancy, and determine whether the target vehicle encroaches the host vehicle driving lane.

The side stop scenarios include an accident, a parking/stop situation, and a low-speed crossing.

The recognition/determination unit 110 obtains sensor data by a camera, a Light Detection and Ranging (LiDAR), a radio detection and ranging (RADAR), or a combination thereof to recognize and determine the front vehicle, and performs the recognition and determination based on the detecting data.

As an exemplary embodiment of the present disclosure, the type, position, speed, size, occupied lane, and/or lane of the target vehicle are determined using a camera, and the position, speed, size, and the like of the target vehicle which is determined using a radar and/or LiDAR.

Next, the driving situation determination unit 120 will be described.

The driving situation determination unit 120 can determine path predictions (i.e., driving straight, turning, following, etc.), driving road determinations (i.e., urban, national highway, expressway, etc.), driving mode determinations (i.e., manual, semi-autonomous, total autonomous mode, etc.), driving state determinations (i.e., normal, abnormal, emergency, etc.), and the like of the host vehicle.

Here, the path prediction of the host vehicle predicts the driving path of the host vehicle in consideration of driver intervention, vehicle system intervention, disturbance, etc.

Furthermore, the driving road determination can determine the urban road, the national highway, the expressway, and the like with respect to the road on which the host vehicle is driving, and in the instant case, control sensitivity and/or the degree of intervention of the system are distinctively performed for each driving road.

In the driving mode, the manual mode refers to a driver-led driving mode, the semi-autonomous driving mode refers to a mode in which a driver and a vehicle system share a role and drive, and the total autonomous driving mode refers to a mode in which a system drives and drives without the driver intervention.

Likewise, the sensitivity of control and/or the degree of system intervention are differentiated for each driving mode.

In the driving state, the normal state means a normal state by the self-determination of the system, and the abnormal state means an abnormal state by the self-determination of the system. The abnormal state may include a state where a component of the vehicle control system or one or more sensors of the vehicle are out of order. Furthermore, the emergency state is a state where the emergency state is determined to be an emergency state by the driver or the system.

Similarly, for the driving status, the control of sensitivity and/or the degree of system intervention may be different for each driving state.

Next, the control strategy unit 130 will be described.

The control strategy unit 130 is configured to determine an optimal control strategy for preventing collision based on the determination result of the recognition/determination unit 110 and the determination result from the driving state determination unit.

To the present end, a method for preventing the collision is determined according to a status of the road occupancy of the front target vehicle (first determination).

Furthermore, the control strategy unit 130 is configured to determine the risk of collision according to the location, size, stop scenario, and the like of the target vehicle (second determination).

The control strategy unit 130 is also configured to determine the degree of system intervention according to the result of determining the driving situation (third determination).

Based on the first, second, and third determinations, the control strategy unit 130 may be configured to determine an optimal control method in consideration of a method of collision avoiding collision, a level of risk of collision, and a degree of system intervention.

Furthermore, the control strategy unit 130 may be configured to determine a control method for the control of sensitivity and the control of preventing errors from the basis of the first to the third determinations.

First, the first determination distinguishes and indexes a lane occupied by the target vehicle and a drivable lane from each other in the entire lane, determine the preventing of steering when there is an unoccupied drivable lane, and determine a prevention by braking when there is no drivable lane as all lanes are occupied.

Next, in the second determination, primarily, the collision overlap and offset are determined according to the position and the size of the target vehicle, the degree of risk of collision is determined according to the stop scenario of the target vehicle, the controllable region is determined according to a collision position between the host vehicle and the target vehicle, and the collision position is indexed based on the host vehicle reference and the target vehicle reference.

Figure 3:
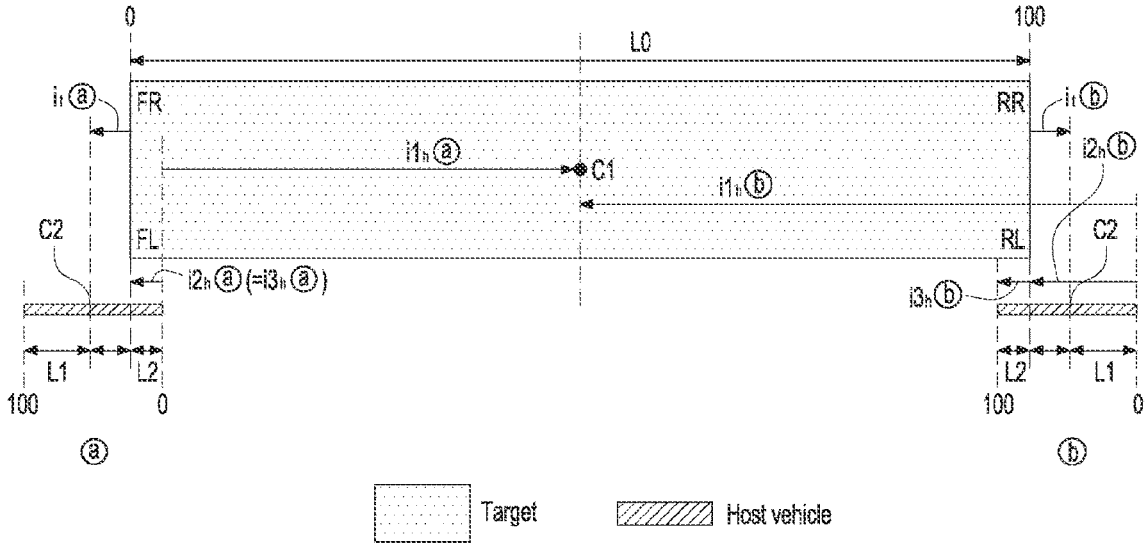
FIG. 3 illustrates an index for a colliding position.

FIG. 3 is an example of such an index, which will be described below in detail.

First, indexes include a target vehicle reference index, the first host vehicle reference index, the second host vehicle reference index, and the third host vehicle reference index.

Here, the target vehicle reference index of the target vehicle is determined to be gradually increased in a direction opposite to the traveling or in a predicted traveling direction of the target vehicle, as an example shown in FIG. 3, a distance from the target vehicle to the central position of the host vehicle is indexed by setting a front bumper of the target vehicle to "0" and setting a rear bumper to "100". In FIG. 3, FR stands for a front right corner of the target vehicle, FL a front left corner. RR a rear right corner, and RL a rear left corner. Also, in FIG. 3. C1 denotes a center of the target vehicle and C2 denotes a center of the front bumper of the host vehicle.

Referring to FIG. 3, when the host vehicle is located at the position (a), the target vehicle reference index is determined as "$-i_r$(a)" because it is positioned to the left from the position "0". In numeric equation, in an exemplary situation shown in FIG. 3, it is determined as "$-(L1-L2)\div L0\times100$".

Next, the first host vehicle reference index is determined to gradually increase in the same direction in consideration of the travelling of the vehicle or the predicted travelling direction of the target vehicle with respect to the front bumper of the host vehicle, and as shown in FIG. 3, the right end portion of the front bumper of the host vehicle is determined to "0" and the left end portion thereof is determined to "100" to implement an update of the distance from the host vehicle to the central position of the target vehicle.

Referring to FIG. 3, when the host vehicle is located at the position a), the first index based on the host vehicle is located to the right at the position of "0" and thus is determined as "$-i1_h$ⓐ". In numeric equation, it is determined as "$-(0.5{\times}L0{-}L2){\div}(2{\times}L1){\times}100$".

Similarly, the second index based on the host vehicle is obtained by setting the right end portion of the front bumper of the host vehicle as "0" and setting the left end portion thereof as "100" to index a distance from the host vehicle to the front or rear of the target vehicle, i.e., the front bumper or the rear bumper. When the center position of the target vehicle is positioned further backward than the host vehicle with respect to the forward or forward-moving direction of the target vehicle, the distance to the front end portion is targeted, and when the center position of the target vehicle is positioned further forward than the host vehicle with respect to the forward or forward-moving direction of the target vehicle, the distance to the rear end portion is targeted.

Referring to FIG. 3, when the host vehicle is located at the position ⓐ, the second index based on the host vehicle is determined as "$i2_h$ⓐ", and is numerically expressed as "$L2{\div}(2{\times}L1){\times}100$".

The third index based on the host vehicle is obtained by indexing a range in which the host vehicle is overlapped by the target vehicle as a percentage based on a left/right length of a front bumper of the host vehicle.

Referring to FIG. 3, when the host vehicle is position at a position ⓐ, the third index based on the host vehicle is determined as "$i3h$ⓐ", and is numerically equal to "$i2_h$ⓐ".

Meanwhile, when the host vehicle is located at a position b, the target vehicle reference index is determined as "itb" and is numerically expressed as "$(L0{+}L1{-}L2){\div}L0{\times}100$".

When the host vehicle is located on position b, the first index based on the host vehicle is determined as "i1hb" and is numerically expressed as "$(2{\times}L1{-}L2{+}0.5{\times}L0){\div}(2{\times}L1){\times}100$".

In the case where the host vehicle is located on b, the second index based on the host vehicle is determined as "i2hb" and is numerically expressed as "$(2{\times}L1{-}L2){+}(2{\times}L1){\times}100$".

In the case where the host vehicle is located at the position ⓑ, a third index based on the host vehicle is determined as "$i3_h$ⓑ" and is numerically expressed as "$L2{\div}(2{\times}L1){\times}100$".

The system can set a predetermined range for each index to determine the risk of collision when the determined index enters within the corresponding range.

For example, the target vehicle reference index, the first host vehicle reference index, the second host vehicle reference index, and the third host vehicle reference index are determined whether each are included in the corresponding range that in the reference thereof, and when it is disposed in the range, the output "1", or else "0", and then the output value for each index is determined using the logical operator and can output a final risk of collision. For example, even when at least one of the output values of the target vehicle reference index, the first host vehicle reference index, the second host vehicle reference index, and the third host vehicle reference index is "0", the risk of collision is output as "0", and when the output value of the comparison of the corresponding range of all indexes is "1", the risk of collision is output as "1".

Furthermore, a predetermined value is determined for each index, and when the value thereof exceeds the predetermined value, it can determined as the risk of collision that cannot be prevented through steering control. When determination of a prevention by steering is impossible, the risk of collision is determined to be the highest.

Here, the predetermined range and/or the predetermined value, which are criteria for determining the risk of collision, automatically adjusts the system according to the presence of a movement history of the target vehicle. For example, when it is determined that the corresponding target vehicle has a movement history as a result of tracking data of the target vehicle obtained by the sensor, the reference range may be expanded.

Through such indexing, it is possible to secure consistent control performance regardless of the size of the target vehicle and/or the host vehicle, and to prevent sensitive and erroneous control.

Next, in the third determination, the degree of system intervention are categorized into high, medium, and low, as followed.

First, as a result of predicting the host vehicle route, it can determine that the situation is normal when driving straight, low when turning, and medium when following. Accordingly, the accuracy of determining the target vehicle within the host vehicle driving route, e.g., within the host vehicle lane, is increased.

Furthermore, as a result of determining a driving road, determining of the road is low in the case of the urban road, medium in the case of the national highway, and high in the case of the expressway.

The purpose of this is to suppress the sensitive control when the target vehicle is a parking/stopped vehicle or a vehicle crossing at a low speed.

Next, as a result of the determining of the driving mode, it may be determined that the vehicle is on the manual mode, that the vehicle is in the medium mode, and that the vehicle is in total autonomous mode. In the case of manual mode, it is to minimize system intervention considering of the preventing driver-led collision.

Furthermore, according to the result of determining the driving state, it is determined that the normal state is high, the abnormal state is low, and the emergency state is medium.

Meanwhile, when the control strategy unit 130 determines the prevention method, it may be configured to determine the prevention by braking when the driving road is on the urban road, and can determine the steering prevention when the driving road is on the expressway.

This is to induce control through prior deceleration or strong deceleration immediately before collision, rather than preventing sharp steering in cases for a complex, urban road, and to escape a collision danger zone by inducing a prior lane change or the like rather than preventing collision by rapid deceleration braking on the expressway which is driving by following a flow of traffic.

The control strategy unit 130 is also configured to determine a prevention by braking when the driving mode is in manual, and is configured to determine a prevention by steering when the driving mode is in autonomous mode.

The purpose is to induce a natural avoidance of dangerous areas through a prior lane change before steering prevention in the case of autonomous driving without driver intervention.

Figure 4:
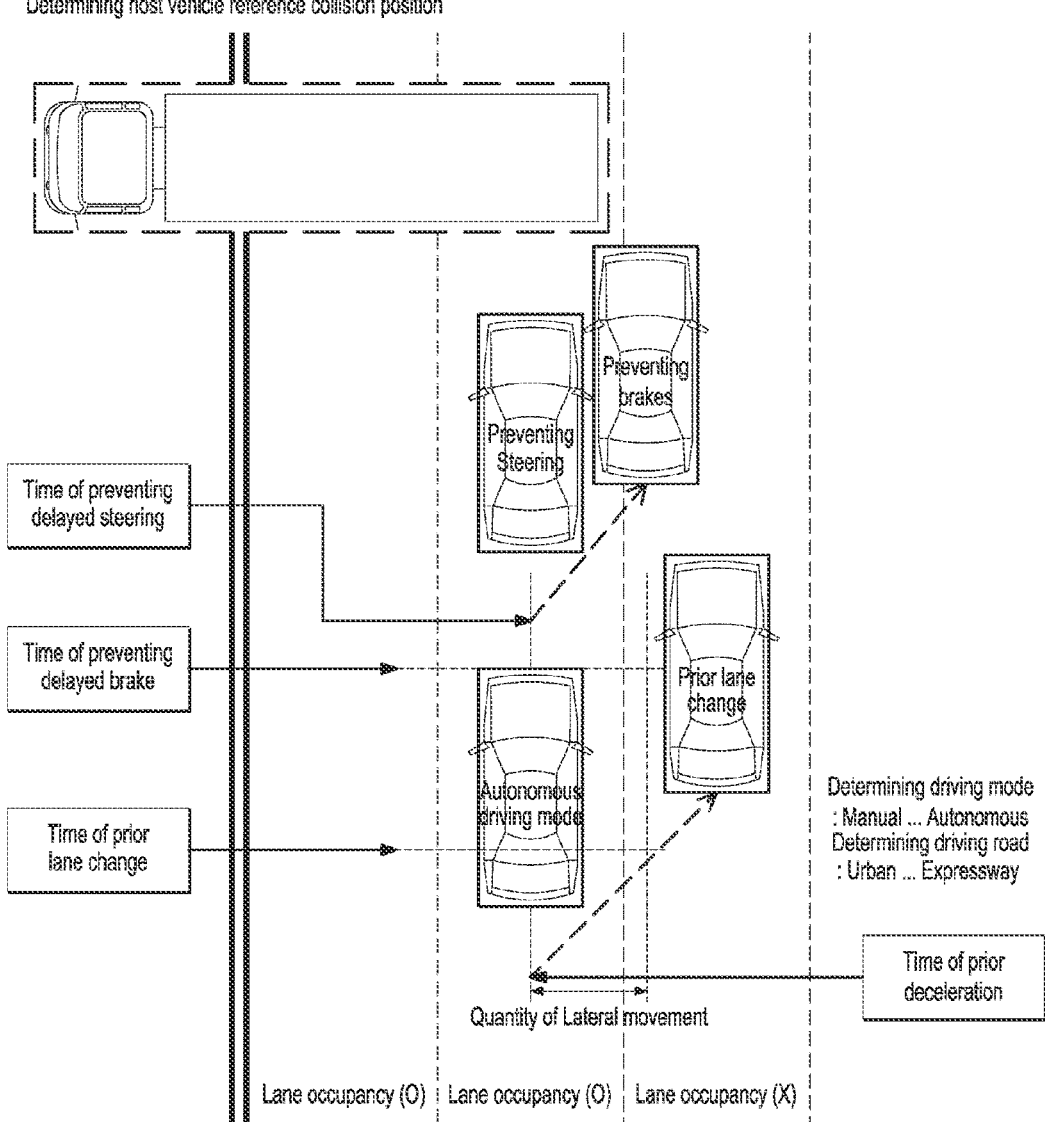
FIG. 4 illustrates a state in which a host vehicle is controlled according to the exemplary embodiment in a state in which a target vehicle is positioned in front of the host vehicle.

In determining the optimal control method based on the first, second, and third determinations as shown in FIG. 4, the control strategy unit 130 can determine any one of preventing or mitigating collision through the delayed braking control, preventing collision through the delayed steering control, preventing collision through prior braking, and collision prevention through prior lane change, for example.

In the instant case, the prevention method is determined according to the driving mode, the driving road, and the degree of system intervention, and the point of time of avoidance is determined based on the determination of the degree of risk of collision based on the collision position with the target vehicle and the distance.

Next, according to the determination result from the control strategy unit 130, the actuator operation unit 140 outputs a command to each corresponding controller to perform at least a warning control, a steering control, or a braking control.

Here, the warning control is for warning the driver of a prior risk of collision, and the warning may be, for example, a warning by an auditory sense (i.e., a speaker warning alarm), by a visual sense (i.e., display of an alert message), or by a tactile sense (i.e., a steering wheel haptic).

For steering control, driving current/voltage/command of a steering actuator for following an avoidance trajectory of host vehicle is transmitted, feedback control may be performed to follow the avoidance trajectory, or a prior lane change or a control of delayed steering prevention may be initiated.

In the case of braking control, a degree of deceleration braking for avoiding collision with a collision-risk object is output, feedback control may be performed to follow the degree required for deceleration, and prior control of deceleration or control of the delayed prevention may be initiated.

FIG. 5, FIG. 6, FIG. 7, FIG. 8, FIG. 9, FIG. 10, FIG. 11, FIG. 12 and FIG. 13 illustrate a result of according to an exemplary embodiment of the present disclosure for each case, and this will be described.

Figure 5:
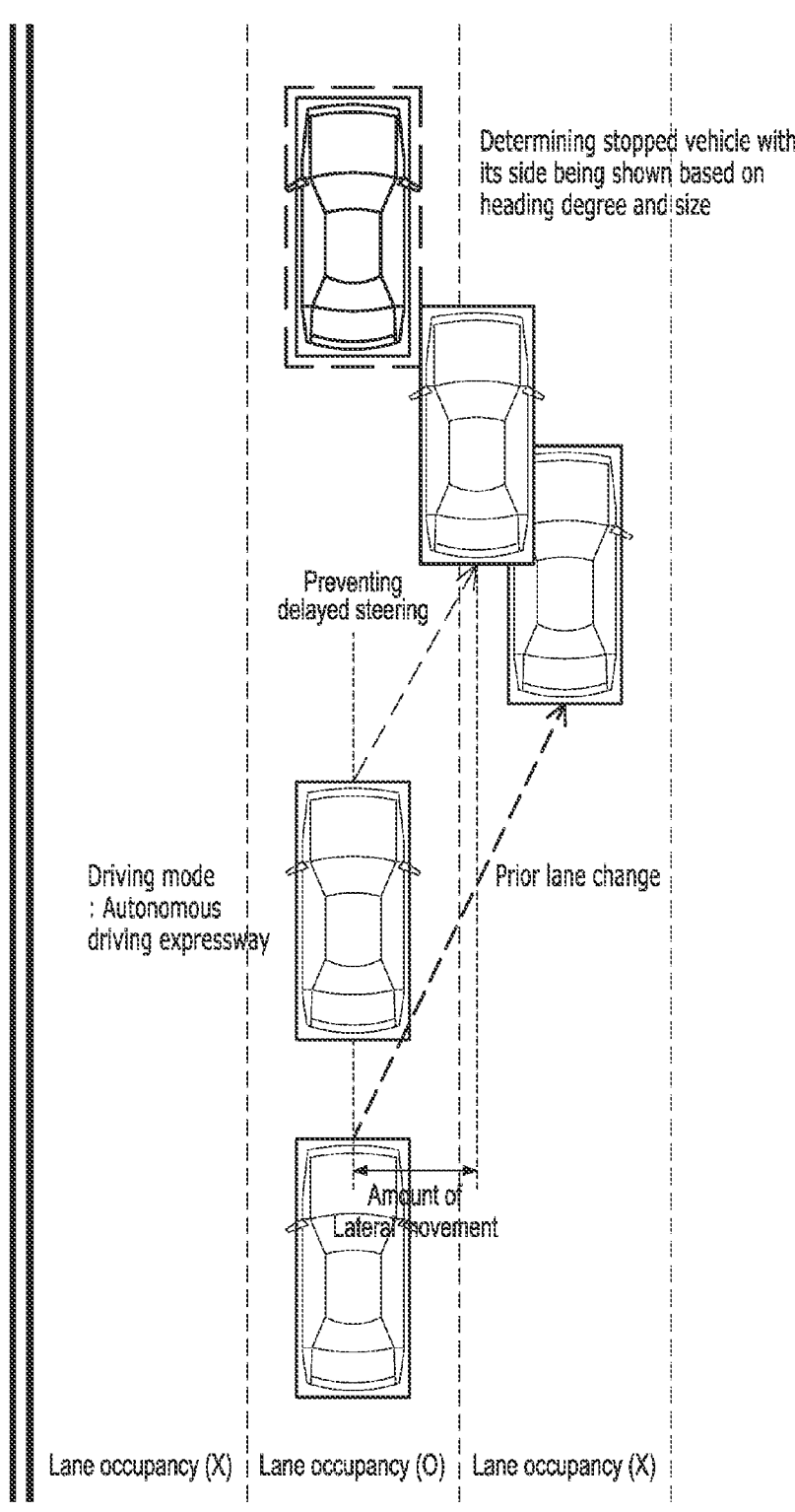

First, in FIG. 5, a front target vehicle based on its heading angle and size is determined as a vehicle slowing or stopping by viewing the rear surface rather than vehicle placed on the side thereof.

In the instant case, when the driving mode is on autonomous mode and the road is on the expressway, the road occupancy state of the target vehicle is a state where the target vehicle currently occupies the driving lane of the host vehicle.

Furthermore, the amount of lateral movement for avoiding steering is determined to be about 2 m, the point of time of avoiding steering is determined to be 0.9 sec before collision, and the braking avoidance time point is determined to be 1.5 sec before predetermined braking force.

In the case of FIG. 5, because autonomous driving is performed on a highway, performing prior lane change to an unoccupied lane is determined.

Figure 6:
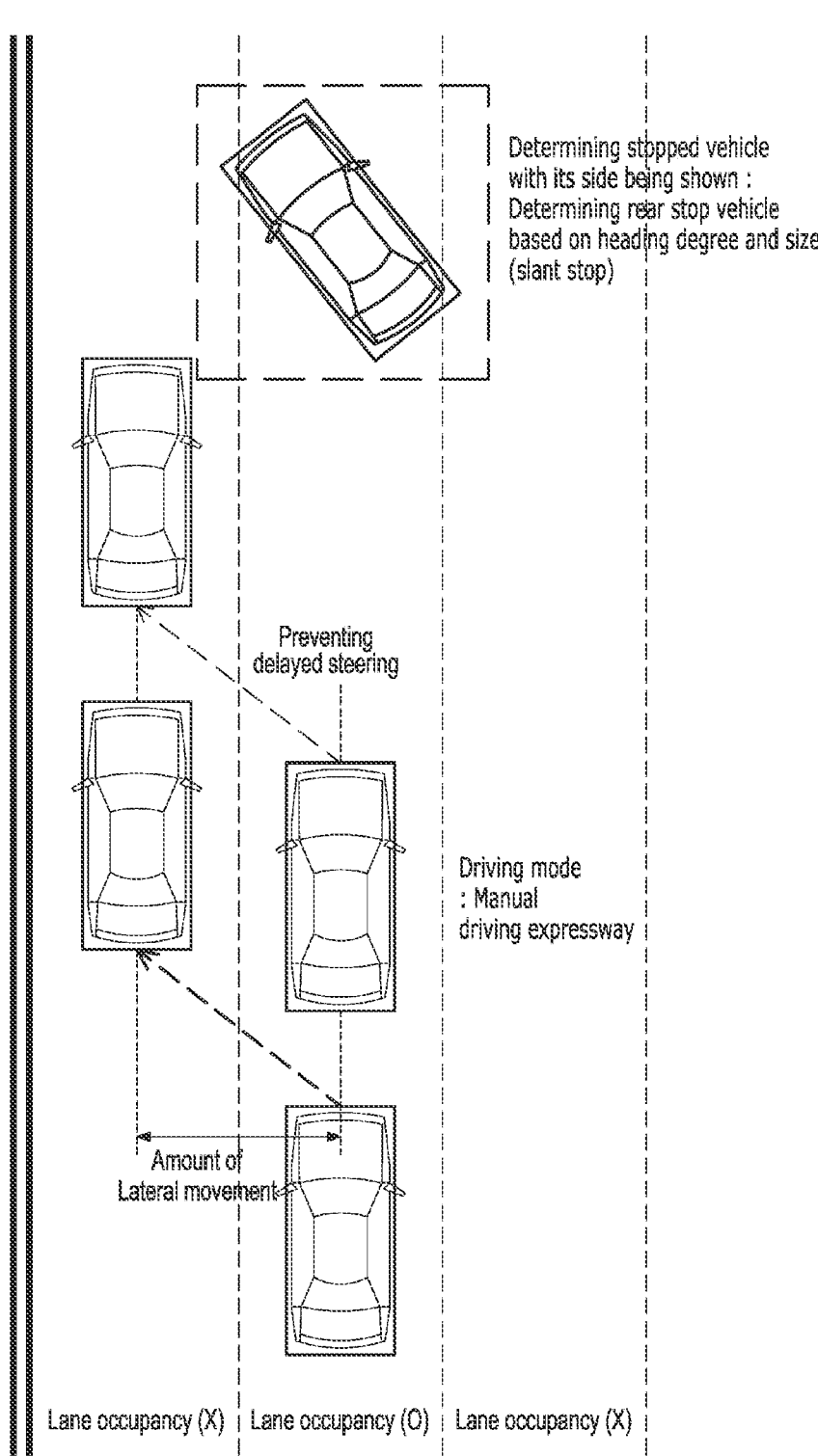

FIG. 6 illustrates a situation where the target vehicle is diagonally slowing down or stopped from the rear based on the heading angle and the size of the target vehicle.

In the instant case, the driving mode is on manual and presumes that the driving lane is the expressway.

In the instant case, the quantity of lateral movement for steering avoidance is determined as 3 m, the point of time of a prevention by steering is determined as 1.1 sec before collision, and the time of a prevention by braking is determined as 1.5 sec before collision.

In the instant case where the driving mode is on manual and is on the expressway with an unoccupied lane, it is determined to perform prior lane change to the lane thereof.

Figure 7:
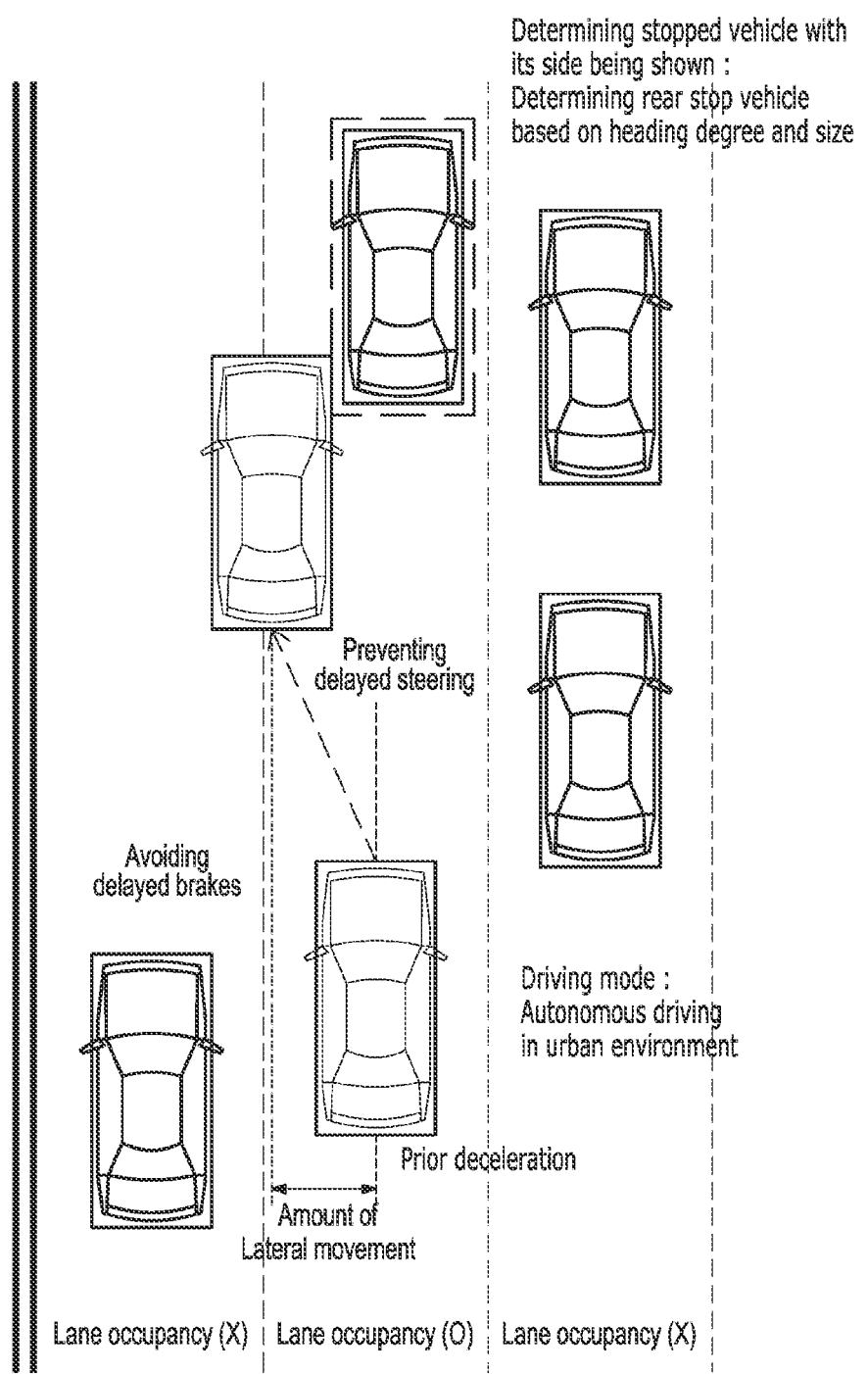

FIG. 7 illustrates a case of driving on an urban road in the autonomous driving mode, and it is assumed that a vehicle ahead of the vehicle is judged to be a vehicle which shows the rear and is slowing down or stopped when determining based on the heading angle and the size of the vehicle.

In the instant case, assuming that the quantity of lateral movement for a prevention by steering is 1.5 m, the time of a prevention by steering is determined as 0.8 sec before collision, and the time of a prevention by braking is determined as 1.5 sec before collision.

In the instant case, prior braking of deceleration is determined because autonomous driving in the downtown have unoccupied lanes.

Figure 8:
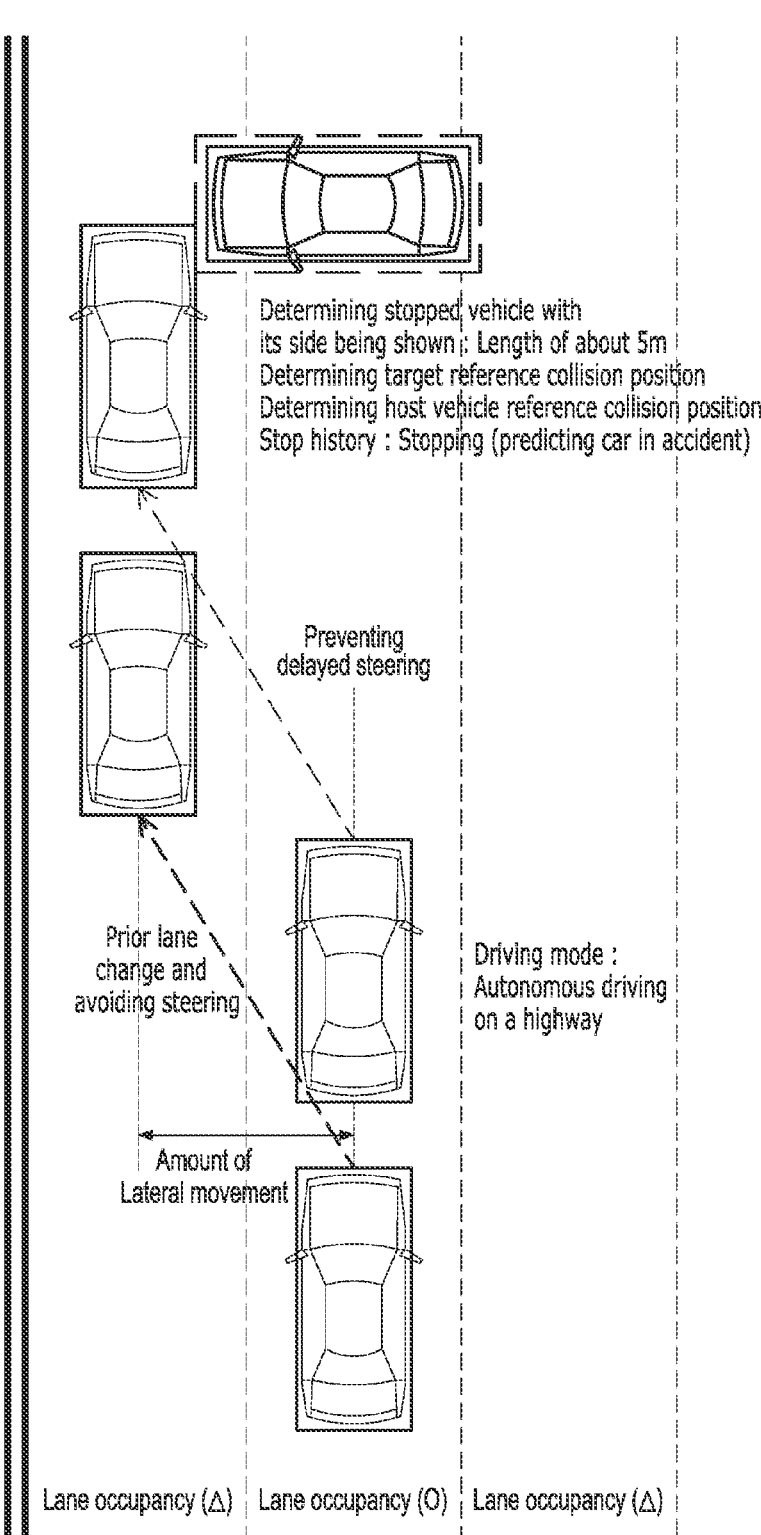

FIG. 8 illustrates a case in which a side length of a front target vehicle is about 5 m, the collision position based on the target vehicle and the collision position based on the host vehicle are determined, and the vehicle is currently stopped as a stop scenario and is predicted as a vehicle accident.

The lane occupancy state is a state in which the host vehicle driving lane is currently occupied, and in the case of the left and right lanes, the lane occupancy state is partially occupied.

In the instant case, it is assumed that a quantity of lateral movement for steering prevention is 4 m, a steering avoidance time point is 1.3 sec before collision, and the point of time of avoiding brakes is 1.5 sec before collision.

In the instant case, since some lanes are occupied and the vehicle is driven in an autonomous driving mode on the expressway, the vehicle is configured to perform prior lane change to unoccupied lanes and prevents steering.

FIG. 9 illustrates a case where a target vehicle has a length of about 5 m, and an accident vehicle is predicted while the target vehicle is stopped, as a result of determining a target collision position and a host vehicle collision position, and a stop scenario of the target vehicle.

In the instant case, the quantity of lateral movement amount for a prevention by steering is 4 m, the time of a prevention by steering is determined as 1.3 sec before the collision, and the time of a prevention by braking is determined as 1.5 sec before collision.

In the instant case, because the target vehicle occupies some lanes and the host vehicle drives in the urban environment in manual mode, the time of a prevention by braking is alerted, and preventing delayed steering than the time in a prevention by steering is controlled after partial deceleration.

In FIG. 10, assuming that a target vehicle includes a length of about 5 m, a target reference collision position and a host vehicle collision position are determined, and a stop history of the target vehicle is stopped, and thus the target vehicle is predicted to be an accident vehicle.

In the instant case, the driving mode is in a semi-autonomous mode, and the driving road is on the expressway.

In the instant case, the quantity of lateral movement for a prevention by steering is determined as 0.5 m, and the time of a prevention by steering is determined as 0.4 sec before the collision and the time of a prevention by braking is determined as 1.5 sec before collision.

In the instant case, since the vehicle is being driven in the semi-autonomous mode and with a lane unoccupied, the vehicle is controlled to perform prior lane change to the lane.

Figure 11:
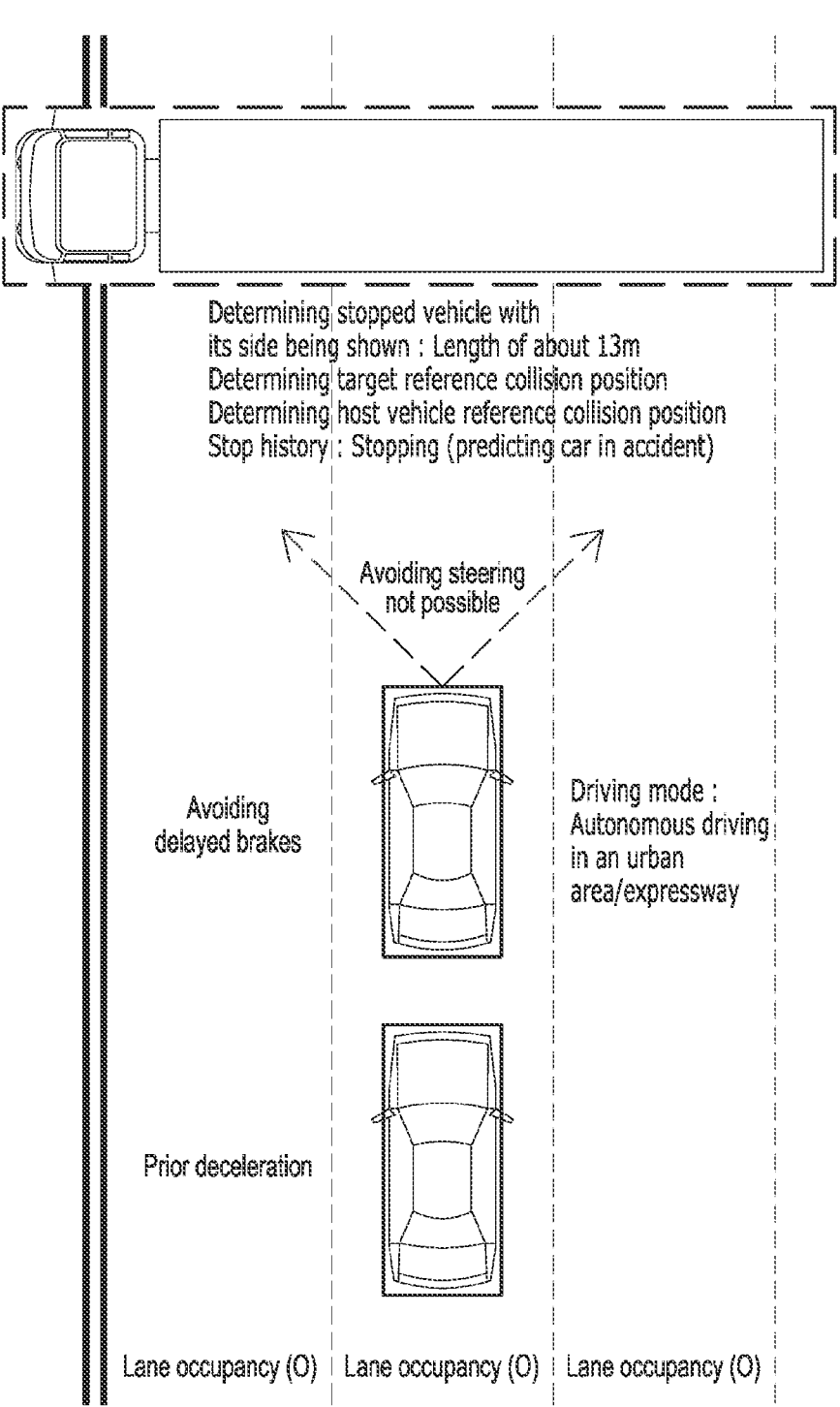

In FIG. 11, assuming that a front target vehicle has a length of about 13 m, a target reference collision position and a host vehicle reference collision position are determined, and a stop history of the target vehicle is stopped and is expected to be an accident vehicle.

A driving mode of a host vehicle is assumed as an autonomous driving mode, and a driving road is in the urban area or on the expressway.

In the instant case, because all lanes are occupied, a prevention by steering is impossible, and the time of a prevention by braking is determined to be 1.5 seconds before the collision.

The vehicle is driven in the autonomous mode, and prior braking of deceleration is performed since prevention by a prevention by steering and turning is impossible by lane change, and preventing delayed brake is performed when the appropriate act of preventing is impossible.

Figure 12:
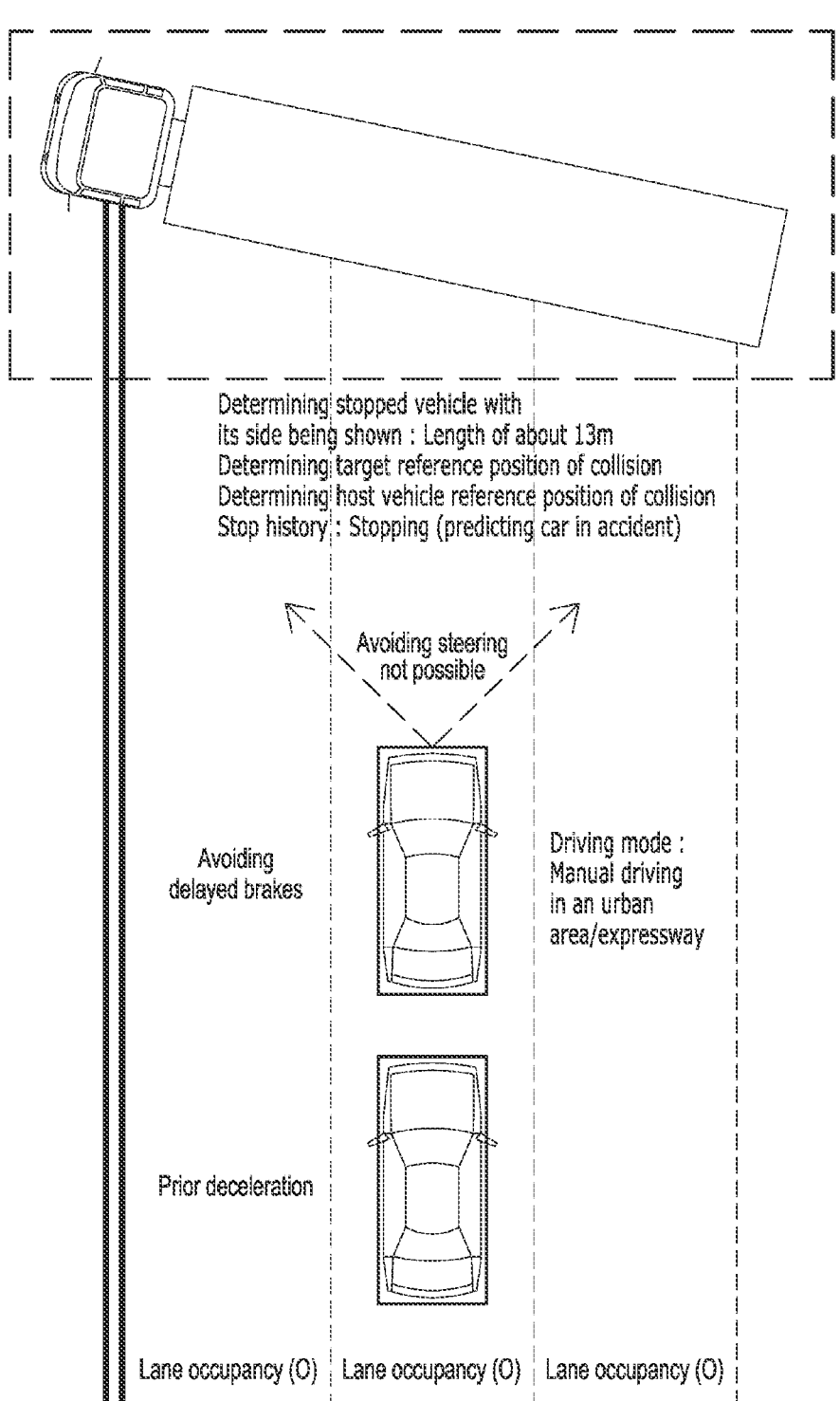

FIG. 12 illustrates a case where a vehicle is located on the side and has a length of about 13 m as a result of recognizing/determining a front target vehicle, in which a target reference collision position and a host vehicle collision position are determined, and the stop history is stopped and predicted to be a vehicle accident.

In the instant case, the driving mode is in a manual driving mode, and the driving road is on the urban area or high-speed driving situation.

In the instant case, because all lanes are occupied, steering prevention is determined to be impossible, and a point of time of a prevention by braking is determined as 1.5 sec before collision.

Although the vehicle is in a manual driving state, it is not possible to prevent steering or a lane change, and thus the vehicle is controlled to perform prior braking of deceleration, and is performed delayed brake prevention when the appropriate act of preventing is not possible.

In FIG. 13, assuming that a front target vehicle is placed on the side, a length of the front target vehicle is about 13 m, the target reference collision position and the host vehicle reference collision position are determined, and a stop history is stopped and is predicted to be an accident vehicle.

In the instant case, the driving mode is an autonomous mode, and the driving road is a highway.

In the instant case, the quantity of lateral movement for a prevention by steering is 2.5m, the time for a prevention by steering is determined as 1 sec before the collision, and the time for a prevention by braking is determined as 1.5 sec before the collision.

In the instant case, because there is a lane which is driving on the expressway, is on autonomous driving mode, and is not occupied, it is controlled to change to the lane in advance.

Furthermore, the term related to a control device such as "controller", "control apparatus", "control unit". "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control system comprising:
at least one processor; and
a memory storing computer readable instructions, which, by being executed by the at least one processor, cause the at least one processor to:
recognize whether a front vehicle is a target vehicle which is stopped or slowing down with a lateral side thereof viewed and to determine a road occupancy state of the target vehicle;
determine a driving situation of a host vehicle;
determine a collision prevention strategy according to results of the recognition and the determination; and
control at least a warning mean, a steering device, or a braking device according to the collision prevention strategy,
wherein the computer readable instructions further cause the at least one processor to perform at least one of a host vehicle route prediction, a driving road determination, a driving mode determination, or a driving state determination,
wherein the host vehicle route prediction includes determining at least one of driving straight, turning, or following of the host vehicle,
wherein the driving road determination includes determining at least one of an urban road, a national highway, or an expressway, wherein the driving mode determination includes determining at least one of a manual mode, a semi-autonomous driving mode, or an autonomous driving mode, and
wherein the driving state determination includes determining at least one of a normal driving state, an abnormal driving state, or an emergency driving state.

2. The vehicle control system of claim 1, wherein the computer readable instructions further cause the at least one processor to recognize at least a vehicle type, a size, a direction, a position, and a moving speed of the target vehicle, a state of road or a lane occupancy, and a stop scenario, in respect to the target vehicle.

3. The vehicle control system of claim 1, wherein the computer readable instructions further cause the at least one processor to determine at least one of a method for collision prevention according to the road occupancy state of the target vehicle, a degree of risk of collision according to a position and a size of the target vehicle, or a degree of system intervention according to the driving situation of the host vehicle.

4. The vehicle control system of claim 3, wherein the computer readable instructions further cause the at least one processor to vary the degree of the system intervention for the urban road, the national highway, and the expressway, to vary the degree of the system intervention for the manual mode, the semi-autonomous driving mode, or the autonomous driving mode, or to vary the degree of the system intervention for the normal driving state, the abnormal driving state, or the emergency driving state.

5. A vehicle control system comprising:
at least one processor; and
a memory storing computer readable instructions, which, by being executed by the at least one processor, cause the at least one processor to:
recognize whether a front vehicle is a target vehicle which is stopped or slowing down with a lateral side thereof viewed and to determine a road occupancy state of the target vehicle;
determine a driving situation of a host vehicle;
determine a collision prevention strategy according to results of the recognition and the determination; and
control at least a warning mean, a steering device, or a braking device according to the collision prevention strategy,
wherein the computer readable instructions further cause the at least one processor to determine a degree of risk of collision according to a position and a size of the target vehicle, and
wherein the computer readable instructions further cause the at least one processor to determine a collision overlap or a collision offset according to the position and the size of the target vehicle in determining the risk of the collision, and to determine an index according to collision positions of the target vehicle and the host vehicle.

6. The vehicle control system of claim 5, wherein the index includes at least a target vehicle reference index determined according to a distance to a position of the host vehicle based on the target vehicle, a first host vehicle reference index determined according to a distance to a center position of the target vehicle based on the host vehicle, a second host vehicle reference index determined according to a distance to a front or a rear of the target vehicle based on the host vehicle, and a third host vehicle reference index determined according to an overlap length of the target vehicle based on the host vehicle.

7. The vehicle control system of claim 6, wherein the target vehicle reference index increases as going toward a direction opposite in a direction in which the target vehicle is advancing or is expected to advance and the first host vehicle reference index and the second host vehicle reference index increases as going toward the direction in which the target vehicle is advancing or is expected to advance.

8. A vehicle control system comprising:

at least one processor; and a memory storing computer readable instructions, which, by being executed by the at least one processor, cause the at least one processor to:

recognize whether a front vehicle is a target vehicle which is stopped or slowing down with a lateral side thereof viewed and to determine a road occupancy state of the target vehicle;

determine a driving situation of a host vehicle;

determine a collision prevention strategy according to results of the recognition and the determination; and control at least a warning mean, a steering device, or a braking device according to the collision prevention strategy, wherein the computer readable instructions cause the at least one processor to prioritize a prevention by braking in response that a driving road of the host vehicle is on an urban road, to prioritize a prevention by steering in response that the driving road is on an expressway, to prioritize the prevention by braking in response that the driving mode is on a manual mode, and to prioritize the prevention by steering in response that the driving mode is an autonomous driving mode.

9. A method for preventing collision with a vehicle occupying a road with a side thereof viewed, the method comprising:

recognizing, by a processor, whether a preceding vehicle is a target vehicle which is stopped or slowing down with a lateral side thereof viewed, and a road occupancy state of the target vehicle;

determining, by the processor, a driving situation of a host vehicle;

determining, by the processor, a collision preventing strategy according to results from the recognizing and the determining of the driving situation; and controlling, by the processor, controlling at least one of a warning means, a steering device, or a braking device according to the determining of the collision preventing strategy, wherein the determining of the driving situation includes performing at least one of a host vehicle route prediction, a driving road determination, a driving mode determination, or a driving state determination, and wherein the host vehicle route prediction includes determining at least one of driving straight, turning, or following of the host vehicle, wherein the driving road determination includes determining at least one of an urban road, a national highway, or an expressway, wherein the determining of the driving mode includes determining at least one of a manual mode, a semi-automatic driving mode, or an autonomous driving mode of the host vehicle, and wherein the driving state determination determines at least one of a normal driving state, an abnormal driving state, and an emergency driving state.

10. The method of claim 9, wherein the recognizing includes recognizing at least one of a vehicle type, a size, a direction, a position, a moving speed of the target vehicle, a state of road or lane occupancy, or a stop scenario with respect to the target vehicle.

11. The method of claim 9, wherein the collision preventing strategy includes determining at least one of a collision preventing method according to the road occupancy state of the target vehicle, a degree of risk of collision according to a position and a size of the target vehicle, and a degree of system intervention according to a result from the determining of the driving situation of the host vehicle.

12. The method of claim 11, wherein the collision preventing strategy includes:

varying the degree of the system intervention for the urban road, the national highway, or the expressway;

varying the degree of the system intervention for the manual mode, the semi-autonomous driving mode, or the autonomous driving mode; or varying the degree of the system intervention for the normal driving state, the abnormal driving state, or the emergency driving state.

13. A method for preventing collision with a vehicle occupying a road with a side thereof viewed, the method comprising:

recognizing, by a processor, whether a preceding vehicle is a target vehicle which is stopped or slowing down with a lateral side thereof viewed, and a road occupancy state of the target vehicle;

determining, by the processor, a driving situation of a host vehicle;

determining, by the processor, a collision preventing strategy according to results from the recognizing and the determining of the driving situation; and controlling, by the processor, controlling at least one of a warning means, a steering device, or a braking device according to the determining of the collision preventing strategy, wherein the collision preventing strategy includes determining a degree of risk of collision according to a position and a size of the target vehicle, and wherein the collision preventing strategy includes:

determining a collision overlap or a collision offset according to the position and the size of the target vehicle in the determining of the degree of the risk of collision; and determining an index according to a position of collision of the target vehicle and the host vehicle.

14. The method of claim 13, wherein the index includes at least one of a target vehicle reference index determined according to a distance to a position of the host vehicle with reference to the target vehicle, a first host vehicle reference index determined according to a distance to a center position of the target vehicle with reference to the host vehicle, a second host vehicle reference index determined according to a distance to a front or rear of the target vehicle with reference to the host vehicle, and a third host vehicle reference index determined according to an overlap length of the target vehicle with reference to the host vehicle.

15. The method of claim 14, wherein the target vehicle reference index is increased as going toward a direction opposite to a direction in which the target vehicle is advancing or is predicted to advance, and the first host vehicle reference index and the second host vehicle reference index are increased as going toward the direction in which the target vehicle is advancing or is predicted to advance.

16. A method for preventing collision with a vehicle occupying a road with a side thereof viewed, the method comprising:

recognizing, by a processor, whether a preceding vehicle is a target vehicle which is stopped or slowing down with a lateral side thereof viewed, and a road occupancy state of the target vehicle;

determining, by the processor, a driving situation of a host vehicle;

determining, by the processor, a collision preventing strategy according to results from the recognizing and the determining of the driving situation; and controlling, by the processor, controlling at least one of a warning means, a steering device, or a braking device according to the determining of the collision preventing strategy, wherein the collision preventing strategy, in determining the collision preventing strategy includes: prioritizing a prevention by braking in response that a driving road of the host vehicle is on an urban road, prioritizing a prevention by steering in response that the driving road is on an expressway, prioritizing a prevention by steering in response that the driving mode is a manual mode, prioritizing a prevention by braking in response that the driving mode is an autonomous driving mode, and prioritizing a prevention by steering in response that the driving mode is an autonomous driving mode.

* * * * *